Sept. 15, 1964 T. J. FARQUHAR 3,148,723
DEVICE FOR IMPROVING THE MIXING OF FUEL GAS WITH FLUX
Filed March 19, 1962
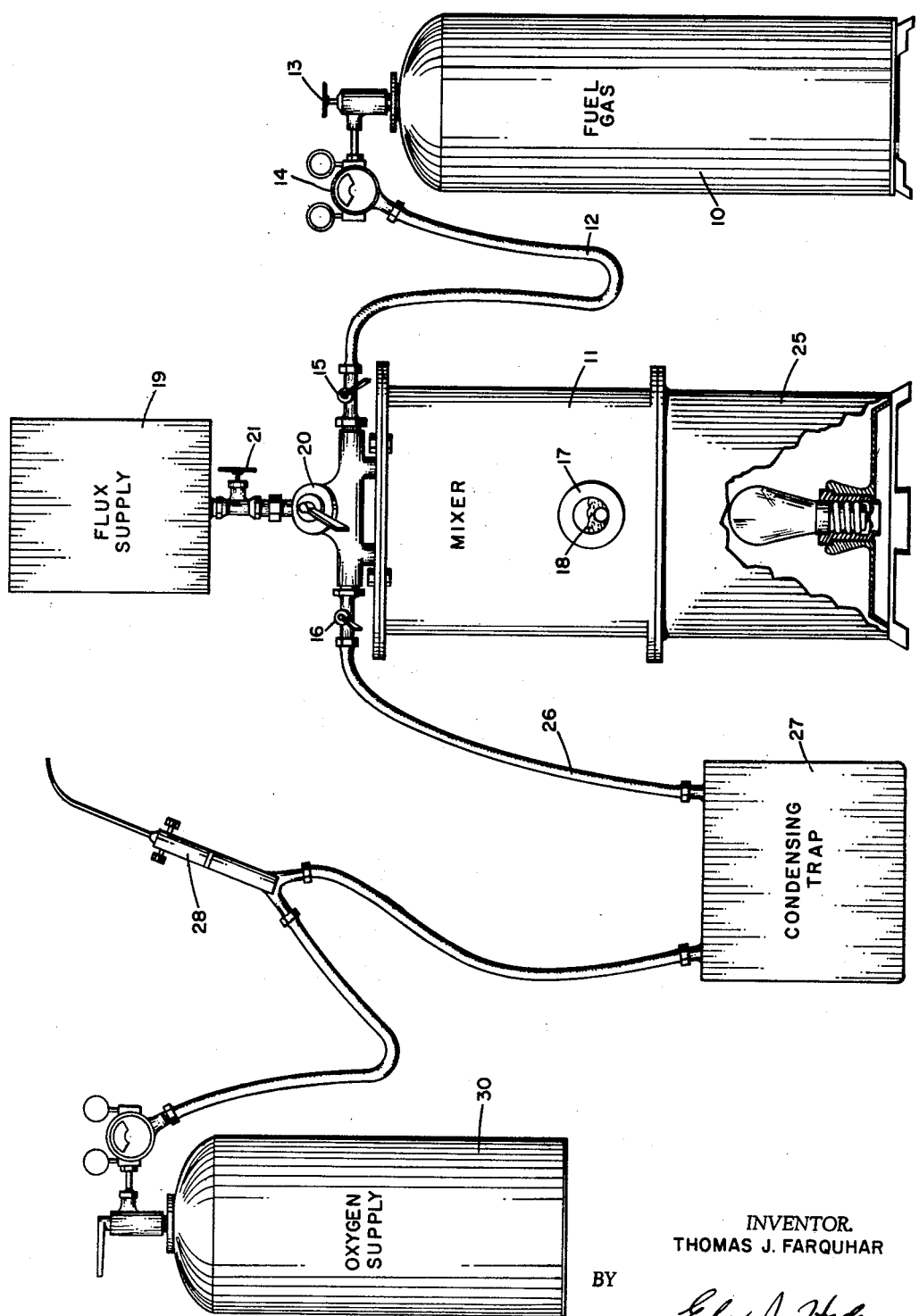
INVENTOR.
THOMAS J. FARQUHAR
BY
*Eber J. Hyde*
ATTORNEY

3,148,723
DEVICE FOR IMPROVING THE MIXING OF FUEL GAS WITH FLUX
Thomas J. Farquhar, 145 N. Logan St., Elyria, Ohio
Filed Mar. 19, 1962, Ser. No. 180,500
4 Claims. (Cl. 158—27.4)

This invention pertains to a device and system for improving the mixing of fuel gas with flux prior to the mixture being burned in a heating or cutting torch.

An object of the present invention is to provide a system and device for mixing flux with a fuel gas for a torch, wherein the gas and flux are more economically used than in prior art devices, and wherein the moisture in the fuel gas is removed to prevent precipitation of solids in the flux which otherwise would lead to clogged lines and equipment.

Another object of the invention is to provide an efficient system for furnishing to a heating torch fluxed gas which is clean and dry.

For a better understanding of the present invention, together with other and further objects thereof, reference is had to the following description taken in connection with the accompanying drawings, and its scope will be pointed out in the appended claims.

An aspect of the present invention lies in the provision of a system for adding flux to a fuel gas for use in a torch or the like, the system including a mixer to be connected to the source of fuel gas, and a supply of flux either in the mixer or connected to it. Means are provided for heating the mixer, thereby to heat the gas-flux mixture, and a pipeline connects the mixer to a torch which burns the fluxed gas. In the pipeline there is a trap or condenser for trapping and containing any moisture which otherwise would flow to the torch, thereby to assure that the torch receives clean, dry fuel.

The single sheet of drawing shows a schematic or diagrammatic view of the system.

Reference character 10 indicates a source of fuel gas such as generated or cylindered acetylene or other such fuel gas. The tank 10 is connected to a mixer 11 by means of hose 12 and a suitable valve 13 and pressure gage 14 may be in the line, as is well known in the art. The mixer 11 may be the well known "Gasfluxer" having an inlet valve 15 and an outlet valve 16. A window 17 is provided through which the level of the liquid flux 18 may be seen.

A supply of the flux 18 is located in a container 19 mounted on top of the mixer 11 and valves 20 and 21 are provided for periodically letting the liquid flux flow from the container 19 down into the mixer 11. When the torch is operating, the valves 20, 21 are closed.

The mixer 11 is mounted on a heater 25 which may merely be a light bulb, or of course a small electric heater wire or other heating device may be used. The heater gently heats the fuel gas and the flux 18 apparently causing a better mixture to be formed.

The flux may be of the type shown, described and claimed in Charles A. Medsker's Patent No. 2,908,599, or any other well known flux may be used. The advantages derived from this system are equally applicable to all fluxes.

The outlet 16 from the heater is connected by hose 26 to a condensing trap 27 which condenses and retains any moisture which may exist in the system and prevents the moisture from reaching the torch 28. A hose line 29 connects the torch 28 to the trap 27, and a supply of oxygen 30 is also connected to the torch 28. Removing the moisture from the system is important because otherwise solids in the flux will precipitate and clog the lines and the torch.

It has been found that the heater greatly increases the efficiency of the fuel and in combination with the trap 27 increases the amount of work which a man can do with a torch by 11%. These two savings mean a lot to the operator of a torch. The operator does not have to worry about his torch flooding when he puts it down, and it is much easier to re-start after being shut down.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

I claim:

1. In a system for adding flux to a fuel gas for use in a torch or the like, means for heating a mixture of the gas and flux and a trap connected to said means for heating the mixture, said trap being located between the means for heating the mixture and the torch to condense and trap any moisture in the heated mixture of gas and flux.

2. In a system for adding flux to a fuel gas for use in a torch or the like, a source of flux, a source of fuel gas, a mixer connected to said source of fuel gas and to said source of said flux to form a mixture, means adjacent said mixer for heating said mixer and the mixture therein, and a trap connected to and located between said mixer and said torch to condense and trap any moisture in said mixture.

3. In a system for adding flux to a fuel gas for use in a torch or the like, a source of flux, a source of fuel gas, a mixer connected to said source of fuel gas and containing a supply of flux, means for heating said mixer thereby to heat the mixture of gas and flux within said mixer, means including a hose connecting said mixer to said torch, said means connecting said mixer to said torch including a condenser to condense and retain any moisture present in said mixed gas and flux as it flows through said hose.

4. In a system for adding flux to a fuel gas for use in a torch or the like, a source of flux, a source of fuel gas, a mixer connected to said source of fuel gas and containing a supply of flux, means for heating said mixer thereby to heat the mixed flux and gas, and means including a trap connecting said heater to a torch.

References Cited in the file of this patent

UNITED STATES PATENTS 2,211,448     Vaughn et al. _____ Aug. 13, 1940
2,719,580     Haag et al. _____ Oct. 4, 1955